Jan. 16, 1962    R. HILL    3,016,565
FISH SCALING AND FILLETING JIG
Filed May 14, 1959
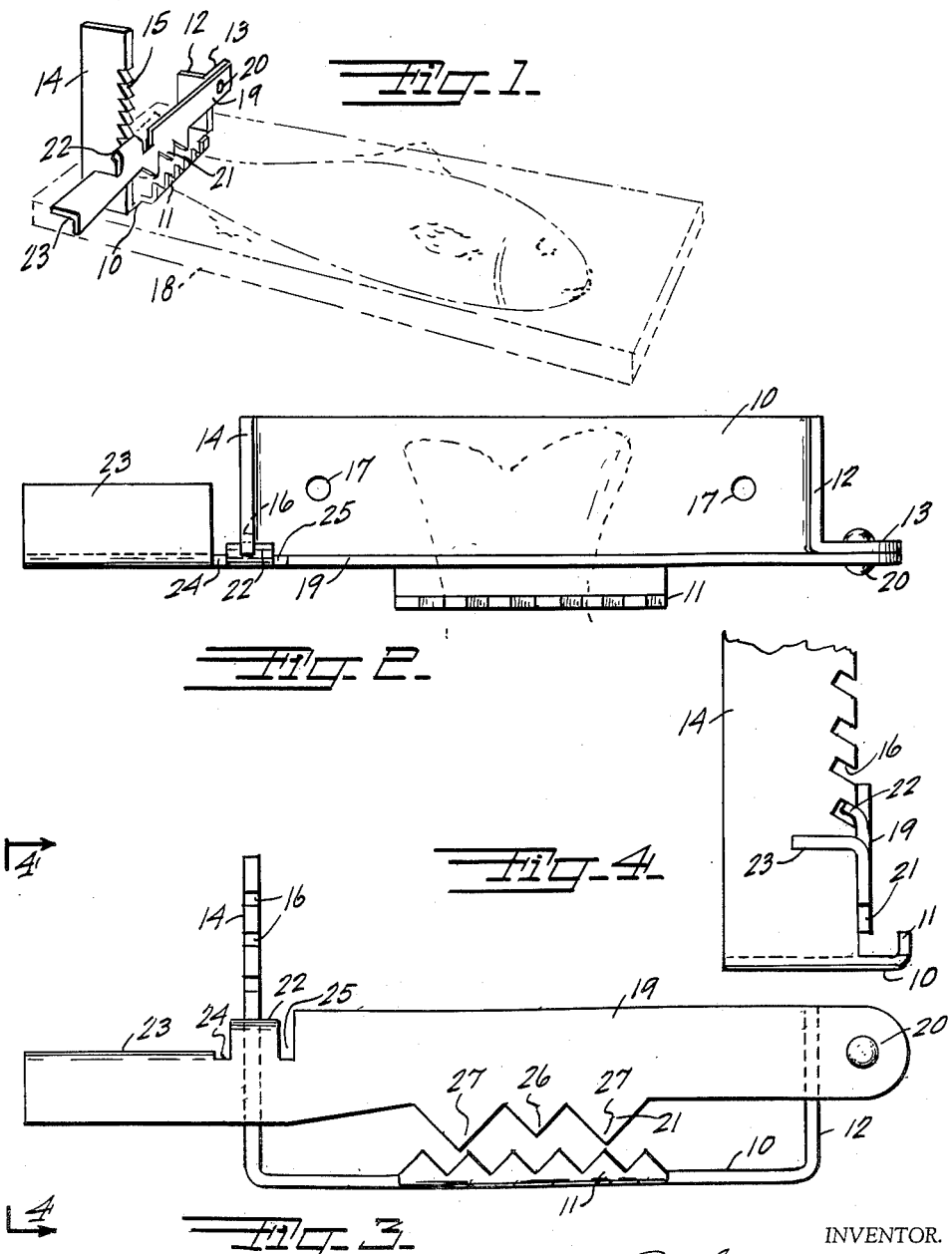
INVENTOR.
Rowland Hill
BY Philip A. Friedell
Attorney

United States Patent Office 3,016,565
Patented Jan. 16, 1962

3,016,565
FISH SCALING AND FILLETING JIG
Rowland Hill, Ben Lomond, Calif.
Filed May 14, 1959, Ser. No. 813,240
7 Claims. (Cl. 17—8)

This invention relates to improvements in means for securely holding a fish during scaling, evisceration, and filleting operations, and provides a jig which will securely hold a fish by the tail without unnecessary tearing of the flesh of the tail portions as has been found quite customary with the usual fish holders, which in some cases, practically sever the tail.

My invention practically eliminates the possibility of tail severance through offsetting of the upper and lower jaws, making the lower jaws relatively short, with the upper jaw having only three teeth with the intermediate tooth shorter than the end teeth so that it will not dig so deeply in the central or thick part of the tail. Operation is also rapid and simple, that of placing the tail of the fish over the lower jaw and pressing down on the handle of the upper jaw which automatically engages and locks, and which is as quickly disengaged by a tap on the side of the handle.

The objects and advantages of the invention are as follows:

First, to provide a fish tail holding jig which will securely hold the tail during scaling, evisceration and filleting operations without unduly mutilating the tail portion of the fish.

Second, to provide a fish tail holding jig in which the upper and lower jaws are offset so as not to grip in the same vertical plane, and thus avoid practical severance of the tail.

Third, to provide a fish tail holding jig as outlined in which the teeth of the lower jaw are relatively short as compared to the teeth of the upper jaw, with the pitch of the teeth of the upper jaw substantially double that of the lower jaw.

Fourth, to provide the upper jaw with a central tooth or teeth terminating in a plane above that of the other teeth to avoid excessive penetration into the thickest central part of the tail.

Fifth, to provide a jig as outlined which is formed of an absolute minimum number of parts and economical to manufacture.

In describing the invention reference will be had to the accompanying drawings, in which:

FIG. 1 is a perspective view of the invention shown as mounted on a plank with a fish in position, the plank and fish being shown in broken lines.

FIG. 2 is a top plan view of the invention.

FIG. 3 is a front elevation of FIG. 2.

FIG. 4 is a fragmentary view showing the engaging means for the upper jaw, and is viewed in a direction 4—4 on FIG. 3.

The invention consists of two parts, one part consisting of the base 10 having a front end and sides, lower jaw 11, hinge standard 12 on one side having an integral hinge ear 13, and the latch standard 14 on the other side which is provided with a series of teeth 15 as shown in FIG. 1, or a series of engaging slots 16 as shown in the other figures, and the base is provided with screw passages 17 for attachment to a support such as a table or plank 18; the other part consisting of the lever 19 which is suitably hinged or pivoted at one end to the hinge ear 13 as indicated at 20, the upper jaw 21 being formed on the underside of the lever, the pawl 22 being formed to engage the teeth or slots, and the handle 23 being formed beyond the latch standard 14.

It will be noted that the said one part is formed of a single piece of sheet metal having both ends bent up from the base 10 at right angles to form the hinge standard 12 and the latch standard 14, the ear 13 being formed at right angles to the hinge standard, and the lower jaw 11 being integral with the base and projecting forwardly from a plane passing through the front plane of the hinge ear and the latch standard, the front edge of the lower jaw projection being turned up at right angles and having a series of teeth formed downwardly therein, the teeth having a height of approximately ¼ inch and a pitch of approximately ⅜ inch or an included angle of approximately 90 degrees. The front edge of the latch standard may be provided with saw teeth as shown in FIG. 1, with the top engaging surface of each tooth being rearwardly upwardly included, or suitable slots or recesses can be formed as shown at 16 in FIG. 4.

The said other part consists of a lever 19 which is hinged or pivoted to the hinge ear 13 as indicated at 20, and has two spaced slots 24 and 25 formed downwardly from the top to span the front edge of the latch standard to permit the latch 22 to be formed rearwardly to engage in the teeth or slots, the slots being upwardly and rearwardly inclined from the front edge, the portion of the lever extending beyond the slot 24 being bent over to form a handle, and the teeth of the upper jaw being formed in the underside of the lever, the central tooth 26 having a height of about ¼ inch at about ½ inch pitch or with an included angle of the respective sides of the teeth of approximately 90 degrees, while the other teeth 27 are made about ⅜ inch high at about ¾ inch pitch and therefore project downwardly to a plane below that of the central tooth to compensate for the increased thickness of the mid portion of fleshy part of the tail and thereby avoid unnecessary penetration or mutilation of this edible part.

When a fish is to be dressed, the tail of the fish is laid over the lower jaw and the lever pressed down into good contact with the tail and released, and which, due to the slight resiliency of the lever and of the ear, will cause the pawl to ride over the teeth and engage in a tooth or slot when the lever is released. Since the upper and lower jaws are parallel and in different vertical planes, the jaws will engage spaced portions of the tail and will hold firmly without undue or unnecessary mutilation or severance as occurs with known types of tail holding jigs. Obviously, this same device can be used for head clamping, for skinning bullheads and catfish.

I claim:

1. A fish scaling jig comprising a base having a front end and sides and means for mounting said base on a support, a fixed jaw formed upwardly from said front end and having a lower transverse series of spaced teeth, a hinge standard formed upwardly from one side and a latch standard formed upwardly from the other side and having a vertical series of engaging elements, the front edges of said hinge standard and said latch standard being located in a vertical plane rearwardly of the vertical plane of said fixed jaw, a lever having one end hinged to said hinge standard and having an underside and having a pawl adjacent the other end to engage in said engaging elements and terminating in a handle and having an upper series of transversely spaced teeth formed in said underside, whereby the tail of a fish is bent over the said lower transverse series of teeth and engaged by the upper transverse series of spaced teeth in rearwardly spaced relation to maintain the tail of the fish free of undue mutilation while securely holding the tail.

2. A structure as defined in claim 1, said fixed jaw having relatively small teeth formed in the top edge, and said lever having a plurality of larger teeth formed in the underside with the center tooth being shorter than the others to compensate for the increased thickness of the mid portion of the tail and with the teeth formed to an included angle of approximately 90 degrees to limit penetration and provide broader grips on the spaced positions on the fish.

3. A fish tail holding jig comprising a base having a front end and sides, and a fixed jaw formed upwardly from said front end and having a series of relatively small teeth formed in the top thereof, a hinge standard formed upwardly from one of said sides and having a hinge ear formed thereon, and a latch standard formed upwardly from the other one of said sides, a lever hingedly connected to said hinge ear and having a movable toothed jaw formed in the underedge thereof intermediate the length thereof and located in a vertical plane rearwardly in spaced relation to said fixed jaw, and engaging elements on and cooperative between said lever and said latch standard for releasably securing the movable toothed jaw in engaging position with the tail of a fish with the tail bent over said fixed jaw and engaged by the movable jaw in rearwardly spaced relation to the fixed jaw to avoid cooperative cutting through the same area by the teeth of the jaws.

4. A structure as defined in claim 3, said movable toothed jaw having a central tooth and side teeth spaced therefrom, with the central tooth being of lesser projection than the side teeth for limited engagement in the thicker mid portion of the tail of the fish to minimize mutilation of the edible portion of the tail, and said teeth being formed to an included angle of approximately 90 degrees to limit penetration and provide wider engagement in the flesh of the fish.

5. A fish scaling and filleting jig comprising a base and means for mounting said base on a support, said base having a front end and sides, a hinge standard formed upwardly on one side and a latch standard formed upwardly on the other side of said base, a holddown lever having a hinge connection at one end to said hinge standard and having a handle formed at the other end, engaging means cooperative between said holddown lever and said latch standard, with depending teeth formed in the underside of said holddown lever, said front end projecting forwardly in spaced relation to said depending teeth and being bent upwardly with the bent-up portion having lower teeth formed in the top thereof in forwardly spaced relation to said depending teeth, whereby the tail of a fish is bent over the lower teeth and spacedly engaged by the upper teeth to prevent severance of the tail with consequent more efficient holding of the fish.

6. A structure a defined in claim 5, said upper teeth comprising a central tooth and a side tooth on each side of the central tooth, with the side teeth being of greater length than the central tooth for substantially equal penetration over the rounded tail portion of a fish.

7. A structure as defined in claim 6, said upper teeth and lower teeth being formed to an included angle of approximately 90 degrees equi-angularly formed relative to the perpendicular for limited penetration and therefore limited marring and more efficient holding of the fish.

References Cited in the file of this patent
UNITED STATES PATENTS

| | | |
|---|---|---|
| 549,333 | Smith | Nov. 5, 1895 |
| 2,048,999 | Dailey | July 28, 1936 |
| 2,813,297 | Dahlin | Nov. 19, 1957 |